United States Patent [19]

Roth

[11] 4,446,159
[45] * May 1, 1984

[54] METHOD FOR FORMING BACON-LIKE PRODUCTS

[76] Inventor: Eldon N. Roth, 14565 Quaker Hill Rd., Nevada City, Calif. 95959

[*] Notice: The portion of the term of this patent subsequent to Dec. 16, 1997 has been disclaimed.

[21] Appl. No.: 272,511

[22] Filed: Jun. 11, 1981

Related U.S. Application Data

[63] Continuation-in-part of Ser. No. 168,542, Jul. 14, 1980, abandoned.

[51] Int. Cl.³ .......................... A23L 1/31; A23P 1/00
[52] U.S. Cl. .................................... 426/249; 426/512; 426/513; 426/517; 426/524; 426/646; 426/802
[58] Field of Search ............... 426/104, 249, 272, 388, 426/393, 615, 641, 646, 512, 513, 515, 517, 518, 524, 802, 656; 425/130, 131.1; 264/171; 62/346; 165/89, 91, 94

[56] References Cited

U.S. PATENT DOCUMENTS

| | | | |
|---|---|---|---|
| 4,098,095 | 7/1978 | Roth | 426/524 X |
| 4,104,415 | 8/1978 | Shanbhag et al. | 426/802 X |
| 4,162,332 | 7/1979 | Sienkiewicz et al. | 426/249 |
| 4,166,138 | 8/1979 | Ziminski et al. | 426/802 X |
| 4,192,899 | 3/1980 | Roth | 426/513 |
| 4,196,222 | 4/1980 | Cheney | 426/802 X |
| 4,197,324 | 4/1980 | Ziminski et al. | 426/249 |
| 4,235,935 | 11/1980 | Bone et al. | 426/249 |
| 4,239,785 | 12/1980 | Roth | 426/513 X |

*Primary Examiner*—Arthur L. Corbin
*Attorney, Agent, or Firm*—Fitch, Even, Tabin & Flannery

[57] ABSTRACT

Bacon-like products are formed from separate "fat" and "lean" components in a continuous process in which the bacon-like product is frozen or refrigerated. The bacon-like product is formed directly upon a freezer drum by means closely regulating the percentages of the various components, the bacon-like product then being compressed upon the drum and chilled or frozen as a sheet during rotation of the drum. The frozen or chilled bacon-like sheet is then removed and passed to further processing preferably including means for cutting the sheet into strips and means for packaging the strips.

16 Claims, 3 Drawing Figures

METHOD FOR FORMING BACON-LIKE PRODUCTS

This is a continuation-in-part of U.S. Patent application Ser. No. 168,542, filed July 14, 1980 and now abandoned.

The present invention relates to a method and apparatus for producing bacon and similar products and more particularly to such a method and apparatus wherein the bacon product is formed in a continuous operation including a freezer drum upon which the bacon product is simultaneously formed and chilled or frozen within a short period of time.

In the prior art, substantial changes have been found necessary or desirable in the production of bacon and other similar products. The great majority of commercially available bacon has been produced by cutting or slicing pork shoulder or other natural cuts of meat to form individual rashers of bacon. At the same time, preservatives including nitrites and nitrates have become widely used in these bacon products in order to prevent spoilage of the meat and to assure the absence of various bacteria such as botulism and trichinosis. More recently, such preservatives have been found to be possibly undesirable in bacon products, thus indicating a need for a method of forming bacon and preserving it for commercial sale without the use of such preservatives.

A trend has also developed of preparing bacon analogs from other meats such as turkey or fowl and even from materials such as vegetable protein products. As examples, reference is made to U.S. Pat. No. 4,061,789, entitled Process of Simluating a Lean and Fat Meat Product, issued Dec. 6, 1977 and U.S. Pat. No. 4,104,415, entitled Process for Preparing Bacon Analog issued Aug. 1, 1978.

Regardless of whether these bacon products are formed from meat or vegetable components, it is particularly difficult and time-consuming to form a product having the appearance of bacon in which lean and fat components appear in generally continuous strips throughout each bacon slice or rasher. One technique for forming synthetic bacon products has been to prepare separate fat and lean slurries consisting of meat or synthetic materials having a similar appearance, the slurries being alternately poured into large containers in thin individual layers. The layered composition or slab is then allowed to set and is thereafter sliced into individual rashers having an appearance quite similar to bacon. If such a material is to be refrigerated, it may be refrigerated while in the layered composition or slab, or it may be refrigerated after slicing. In any event, the process is relatively complex and time-consuming. In addition, if the materials from which the synthetic bacon is to be formed are subject to bacterial growth, such growth continues during the time required for refrigeration of the relatively thick-layered composition or slab.

Naturally, if the material from which the synthetic bacon is being formed is subject to bacterial growth or the like, the addition of preservatives or preservative treatment may be considered. If preservatives are not added, it is generally necessary to freeze the product and maintain it in a frozen condition until the time of consumption. After such products are formed, it may also be desired to further treat them by the addition of curing agents, smoked flavoring or the like in order to further enhance the flavor of the product.

Regardless of the particular technique employed for forming such synthetic bacon products, it is immediately apparent that a substantial number of different steps have been involved which undesirably increase the length of time during which the various components are in process and subject to bacterial growth. In addition, the number of steps and the time involved for forming such synthetic bacon products are undesirable because of both operating and capital costs.

Accordingly, there has been found to remain a need for a method and apparatus for rapidly and continuously forming synthetic bacon from meat, vegetable and/or other materials.

Summary of the Invention

It is therefore an object of the present invention to provide a method and apparatus for rapidly and continuously forming synthetic bacon products or the like.

It is a further object of the invention to provide such a method and apparatus for rapidly and continuously forming bacon product wherein the method and apparatus include a drum freezer suitable for immediately chilling or freezing the bacon product within a minimum period of time after formation of the bacon product.

It is a more specific object of the invention to provide a method and apparatus for rapidly and continuously forming synthetic bacon products wherein "lean" and "fat" components are initially formed in slurry or paste consistency and combined at an application point of a drum freezer to form a continuous sheet of bacon product having alternating streaks or phases of lean and fat components. As was noted above, the lean and fat components may be formed either from animal or vegetable products, for example. The nip may be formed immediately between the application roller and the drum freezer itself or, if necessary for example to insure adhesion between the different components, the nip may be formed upon the application roller and a sheet of material then transferred to the drum freezer.

During rotation of the drum freezer, the bacon product is formed to a selected thickness and chilled or frozen, the sheet of bacon material preferably being urged into heat exchange contact with the drum freezer by a feed roller and preferably by one or more compression rollers rotating in spaced apart relation relative to the freezer drum. When the sheet of bacon product is suitably chilled or frozen, it is removed from the freezer drum and passed to further processing including, for example, a cutting station and a packaging station.

It is a further object of the invention to provide means for injecting one of the components into a mass of the other component in the nip so that generally continuous streaks of the one component are formed in a sheet on the drum. Through the use of such injection means or, more preferably, a bank or gang of injectors, the operating pressure of the injectors may be varied, and/or vibrator means may be associated with the injectors, or similar steps may be taken in order to achieve normal-appearing variations in the lean and fat streaks formed throughout the sheet of bacon product. A temperature differential may also be maintained between the two components at the time of their combination to improve adhesion between the components and to improve definition between the lean and fat streaks formed in the bacon product sheet.

It is also an object of the invention to provide a bacon product formed in the manner summarized above.

As was noted above, the synthetic bacon or a similar product may be formed, for example, from meat or vegetable components or a combination thereof. In addition, the bacon product may be further processed if desired during or after the freezing operation referred to above. For example, if a precooked product is desired, the individual components may be first cooked or else the individual slices removed from the freezer drum may be cooked and refrozen or otherwise preserved.

Additional objects and advantages of the invention are made apparent in the following description having reference to the accompanying drawings.

Description of the Preferred Embodiment

Figure 1:
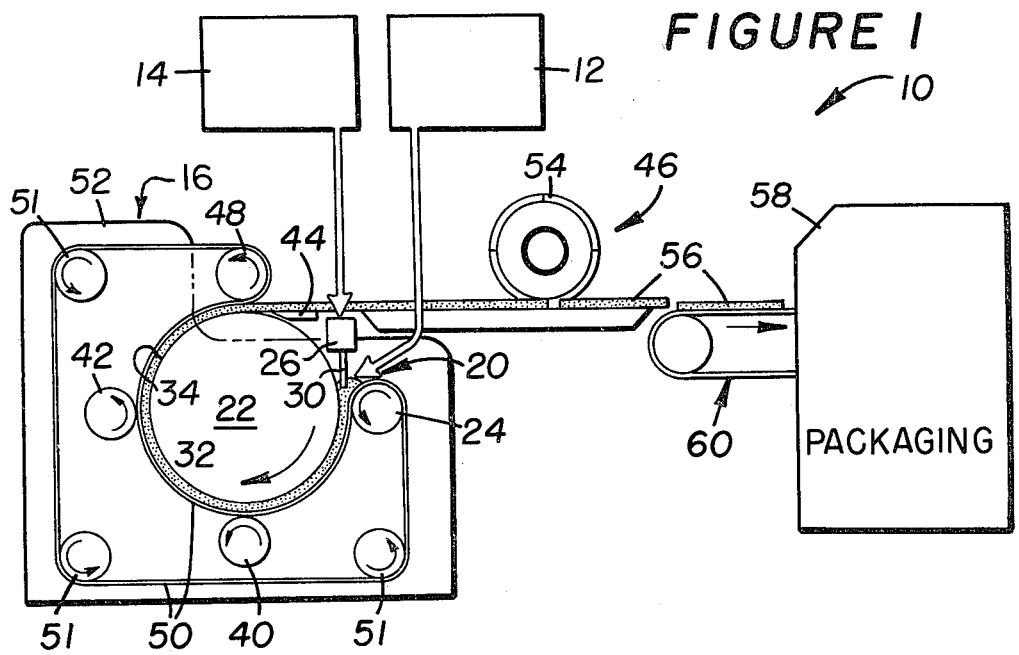
FIG. 1 is a generally schematic respresentation of apparatus for forming a synthetic bacon product in accordance with the present invention.

Essentially, the method and apparatus of the present invention relate to the generally continuous manufacturing of a bacon product wherein two components or slurries formed from meat and/or other food products are extruded to a desired thickness and chilled or frozen by means of a drum freezer. The present invention particularly contemplates that the two components or slurries are intermixed in the form of generally continuous streaks or phases in order to closely resemble natural bacon.

A drum freezer of the type employed within the present invention is specifically described and claimed in U.S. Pat. Ser. No. 688,599 filed on May 21, 1976 and entitled "Refrigeration Apparatus for Viscous Paste Substances," now U.S. Pat. No. 4,098,095, which is incorporated herein by reference.

The term "bacon product" is employed within the present application to include a product formed according to the present invention regardless of whether it is formed from meat products such as pork, beef and/or fowl or from vegetable products either alone or in combination with meat products, or even other food products.

Referring now to the drawings, the present method of forming a bacon product includes the initial step of preparing two slurries of a generally paste-like consistency from materials as described above in order to provide the "fat" and "lean" components of the bacon product. It is noted again that the composition of each of the fat and lean components need not be entirely either fat or lean meat. Rather, the materials in both of these components may be selected in order to adjust the overall fat content of the finished bacon product. For example, the fat component may include substantial lean meat for this purpose. At the same time, the lean component may include some fat or oil content in order to improve adhesion with the fat component. Otherwise, the actual materials selected for the fat and lean components are not an essential limitation of the present invention other than to the extent that they are selected to achieve proper adhesion with each other in order to form a continuous material.

Figure 2:
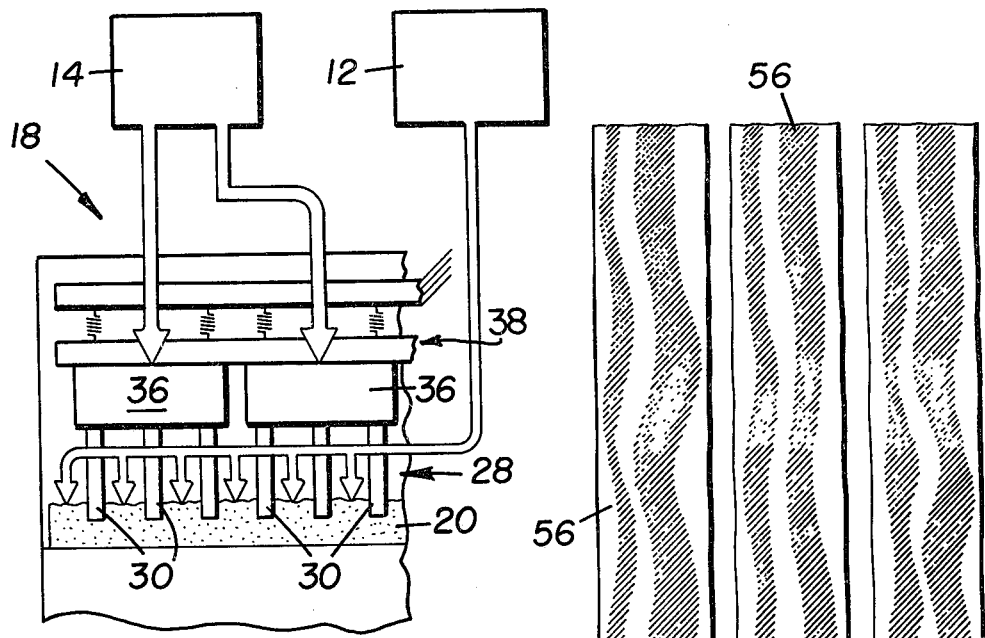
FIG. 2 is an enlarged fragmentary view illustrating injection means for forming the synthetic bacon product.

Within the present invention, having particular reference to FIG. 1, the two slurries in the form of a fat and lean component respectively are prepared in suitable blenders 12 and 14 forming a portion of the overall apparatus 10. The fat and lean components from the blenders 12 and 14 are transferred directly to the drum freezer indicated at 16 through a feed assembly generally indicated at 18 and shown in greater detail by FIG. 2. Continuing with reference to FIG. 1, its construction and operation are described in substantial detail by the above noted references. For purposes of understanding the feed assembly 18 of FIG. 2, a nip 20 for receiving material to be applied to the drum 16 is formed between a large refrigerated drum 22 and a feed roller 24. Within the present invention, one of the slurry components, preferably that component comprising the greater portion of the bacon product, is delivered as a continuous mass within the nip 20. It is contemplated that the fat component from the blender 12 comprises the greater portion of the bacon product and thus is delivered as a continuous mass in the nip 20. For example, the fat slurry may be delivered to the nip 20 by means of one or more extruders 36 extending along the length of the nip between the feed roller 24 and the refrigerated drum 22. The lean slurry component is then preferably injected at numerous points into the nip 20 by means of a bank of injectors 28 formed with outlet nozzles 30 extending closely adjacent the point of juncture between the feed roller 24 and the refrigerated drum 22. As the lean component is extruded from the nozzles 30, it tends to form streaks or phases of lean meat within the sheet 32 of bacon product formed upon the peripheral surface 34 of the drum 22.

Figure 3:
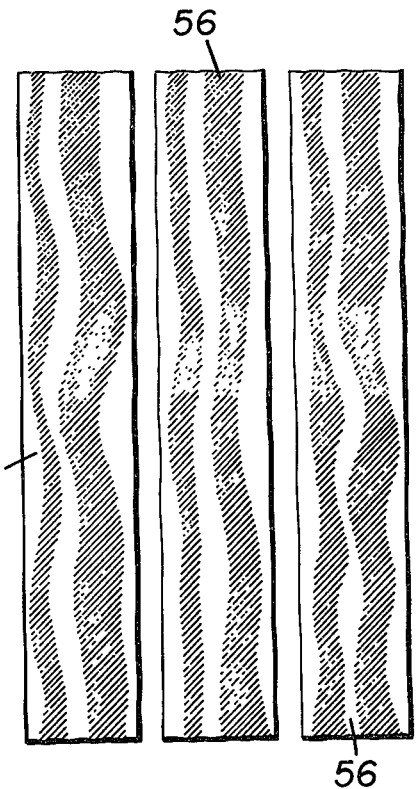
FIG. 3 is a fragmentary view illustrating individual slices or rashers of bacon product after removal from the apparatus of the present invention and after passage through a suitable cutting station.

The lean component from the blender 14 enters the respective injectors 28 through extruders 36. Pressure within the extruders 36 may be continuously or intermittently varied by means of a piston or the like (not shown) in order to vary the amount of material being extruded from each nozzle at any given time in order to produce a more natural appearing bacon product. Similarly, all of the injectors 28 may be mounted upon a vibrating frame 38 which is similarly intended to enhance the appearance of the bacon product as it is initially formed into the sheet 32. The manner in which the continuous streaks of both lean and fat components are formed within the bacon product is better illustrated in FIG. 3.

Relative temperatures of the two components may be adjusted for various purposes at the time of their combination. For example, a predetermined temperature differential is preferably maintained between the two components, prior to their combination, in order to improve adhesion between the components and to get better definition between the components or phases.

The surface 34 of the drum 22 is maintained at a chilled or refrigerated temperature, for example, about 0° F. The temperature of the heat transfer surface 34 relative to the temperature of the fat and lean components is selected in accordance with the second noted reference above. In particular, the heat exchange surface 34 of the drum is preferably sufficiently lower than the temperature of the slurry components in order to cause the sheet 32 to adhere in heat transfer relation to the drum surface 34.

The feed roller 24 for the refrigerated drum 22 serves two particularly important functions within the present invention. Initially, it applies the blended material to the surface of the drum in order to permit it to become chilled or refrigerated and to facilitate further processing as described below. In addition, the feed roller 24 establishes the thickness for the sheet 32 of bacon product upon the refrigerated drum. While the sheet of bacon product 32 is upon the surface 34 of the drum, it is further compressed by additional compression rollers 40 and 42. The compression rollers insure that the blended material remains in heat exchange contact with the surface of the drum and also recompress the sheet 32 in order to maintain the final thickness desired for the bacon product. The feed roller 24 may also be refrigerated similarly as the drum 22 in order to similarly cool or refrigerate both sides of the sheet 32 as it is formed between the drum and feed roller.

After the sheet 32 is sufficiently chilled or frozen upon the surface 34 of the drum, it is removed from the drum surface, for example, by means such as a blade 44 and transferred toward a cutting station 46. Another roller 48 immediately precedes the blade 44 in order to assure proper removal of the sheet 32 from the drum surface.

Since the bacon product may not have sufficient fat or liquid content in order to assure its adhesion to the heat transfer surface of the drum, an endless belt 50, preferably formed from stainless steel, is trained about the feed roller 24, the compression rollers 40, 42, idle rollers 51, and the removal roller 48. The stainless steel belt 50 serves to maintain the product in intimate heat exchange contact with the surface of the drum and to maintain the uniform thickness of the bacon product as established by the feed roller 24 and the compression rollers 40 and 42.

It is further contemplated that additional means may be necessary in order to assure proper release of the frozen or chilled sheet of bacon product from the endless belt 50 as well as from the surface of the freezer drum itself. The blade 44 serves to remove the sheet from the drum surface. A similar blade may also be employed to separate the sheet from the endless belt 50. However, the present invention preferably contemplates the use of means (not otherwise shown) for heating the surface of the removal roller 48 and the adjacent portion of the belt 50 in order to assure release of the sheet 32 as it passes therebeneath. A heated fluid could be circulated through the roller 48 or an electrical resistance heater could be used for this purpose.

In order to more rapidly accomplish chilling or freezing of the bacon product upon the drum 22, the freezer drum assembly 16 is enclosed within a housing 52 wherein refrigerated air is circulated to more rapidly cool the belt 50 and facilitate rapid chilling or refrigeration of the bacon product sheet 32.

Within the cutting station 46, cutting means 54 cut the frozen or chilled sheet 32 of bacon product into individual strips indicated at 56 having generally uniform dimensions. For example, the individual strips 56 may be approximately one inch wide and six inches long. Preferably, the cutting means 54 comprises a rotary cutter driven in synchronization with the drum 22 because of the possibly fragile nature of the bacon sheet. Additional guide means (not shown) are provided for laterally guiding the bacon sheet toward the cutting means.

As the bacon product strips 56 exit the cutting station 46, they are transported to a suitable packaging station 58 by a conveyor 60 to facilitate shipment and/or marketing.

Numerous variations will be apparent for the method and apparatus of the present invention as set forth above. For example, the preferred embodiment of the present invention includes means for depositing a continuous mass of the fat component within the nip of the feed roller and then injecting the other lean component to form generally continuous streaks or phases of lean meat in the sheet formed upon the freezer drum. It would also of course be possible to also use similar injectors for the fat component or to employ injectors for the fat component with the lean component being deposited as a continuous mass within the nip of the feed roller.

In some applications, it may also be necessary or desirable to slightly heat both components when the sheet 32 is first formed, for example, to improve adhesion between the components. For this reason, it would be possible to initially form the sheet upon the feed roller with a nip being formed by an additional roller (not shown). With such an arrangement, either of these feed rollers could be heated, for example, to better assure adhesion between the fat and lean components. The sheet could then be transferred to the freezer drum 22 and otherwise processed as described below.

As noted above, the finished strips of bacon product are preferably packaged and maintained in a frozen condition until they are ready for consumption. On the other hand, it would also be possible to provide means for precooking the individual components or even for cooking the finished strips after they pass through the cutting station 46. In that event, additional refrigeration means might be provided in order to again refrigerate the bacon products prior to being packaged and transported or stored. It would also of course be possible to employ preservatives, for example, in order to permit storage of the bacon product strips without freezing them.

Additional variations and modifications will be apparent within the scope of the present invention in accordance with the preceding description. The scope of the present invention is therefore defined only by the following appended claims.

What is claimed is:

1. In a method for manufacturing a bacon-like product, the steps comprising forming first and second edible components to have a slurry or paste-like consistency, providing a refrigerated rotating drum to have a peripheral heat transfer surface, blending together and applying the first and second components onto the heat transfer surface of the drum as a sheet having an established initial thickness and generally continuous streaks of each component in a manner resembling natural bacon, the bacon-like sheet being placed in intimate contact with the heat transfer surface, cooling the bacon-like sheet upon the heat transfer surface of the drum and removing the bacon-like sheet from the drum.

2. The method of claim 1 further comprising the steps of passing the sheet through a cutting station to cut the sheet into individual strips and transferring the individual bacon-like strips to a further processing station.

3. The method of claim 1 wherein the temperature of the two components is initially maintained sufficiently above the temperature of the heat transfer drum surface in order to promote adhesion of the sheet to the drum.

4. The method of claim 1 wherein the two components are maintained at a predetermined temperature differential relative to each other prior to being applied to the drum.

5. The method of claim 1 wherein the applied bacon-like sheet is formed upon the drum surface by means of a feed roller forming a nip in combination with the refrigerated drum for receiving the two components.

6. The method of claim 5 wherein at least one of the components is injected into the nip between the feed roller and refrigerated drum in order to form generally continuous streaks of the one component in the bacon-like sheet.

7. The method of claim 6 wherein the one component is delivered to the nip through a plurality of injectors each including a nozzle mounted generally closely adjacent the juncture between the refrigerated drum surface and the feed roller.

8. The method of claim 7 wherein the injectors include means for varying the pattern of the streaks of said one component within the sheet in order to more closely resemble natural bacon.

9. The method of claim 1 wherein the bacon-like sheet is refrigerated to a frozen condition upon the freezer drum.

10. The method of claim 1 further comprising additional compression rollers for engaging the bacon-like sheet upon the refrigerated drum surface in order to maintain its heat transfer adhesion to the drum and to maintain the thickness of the bacon-like sheet.

11. The method of claim 1 wherein the outer surface of the bacon-like sheet upon the refrigerated drum is engaged by means of a continuous belt in order to assist in maintaining the bacon-like sheet upon the drum and to assist in its refrigeration.

12. The method of claim 11 wherein the refrigerated drum is positioned within a housing wherein a refrigerated fluid is circulated to assist in cooling the bacon-like sheet.

13. The method of claim 11 further comprising means for disengaging the bacon-like sheet from the drum and from the continuous belt after the bacon-like sheet is suitably refrigerated.

14. The method of claim 1 wherein the two components are formed from meat products selected to control the overall fat content of the finished bacon-like strips.

15. The method of claim 1 wherein the two components are formed from a selected combination of meat and/or vegetable products.

16. The method of claim 1 wherein the bacon-like sheet is precooked after removal from the drum.

* * * * *